United States Patent [19]

Eaton, Jr. et al.

[11] 4,029,940
[45] June 14, 1977

[54] PERCOLATOR

[75] Inventors: John Littell Eaton, Jr., Delanco, N.J.; Richard Henry Brill; Walter E. Myers, both of Philadelphia, Pa.

[73] Assignee: SCM Corporation, New York, N.Y.

[22] Filed: June 9, 1975

[21] Appl. No.: 584,795

Related U.S. Application Data

[62] Division of Ser. No. 451,336, March 18, 1974, Pat. No. 3,939,760.

[52] U.S. Cl. .................................. 219/506; 219/248
[51] Int. Cl.² ........................................... H05B 1/02
[58] Field of Search .......... 219/109, 248, 253, 269, 219/487, 506; 236/94; 99/342; 116/114.5

[56] References Cited
UNITED STATES PATENTS

| | | | |
|---|---|---|---|
| 2,527,775 | 10/1950 | Sutton | 219/248 X |
| 2,566,270 | 8/1951 | Weiland | 219/248 X |
| 3,352,998 | 11/1967 | Yai et al. | 219/248 X |
| 3,781,521 | 12/1973 | Kircher | 219/506 X |

*Primary Examiner*—Bruce A. Reynolds
*Assistant Examiner*—Fred E. Bell
*Attorney, Agent, or Firm*—Milton Wolson; Ernest F. Weinberger

[57] ABSTRACT

An electric percolator having a liquid containing section formed from an assembly of glass and other materials fixed together by means of a locking collar. The lid of the percolator is held in place by means of a quick-release latching mechanism which prevents the lid from being disengaged by the lifting motion normally used to open a lid and instead requires a twisting motion which rapidly releases the lid. Simplified electrical circuitry in the percolator utilizes a single lamp that indicates both the "Brewing" and the "Keep Warm" modes of percolator operation.

A method is also set forth for assembling a composite apparatus, having a glass component which does not require threading, strapping or gluing of the glass component.

4 Claims, 26 Drawing Figures

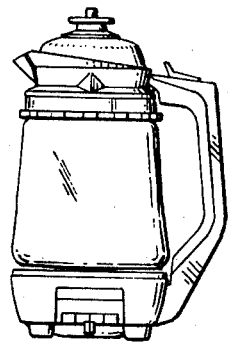
FIG. 1
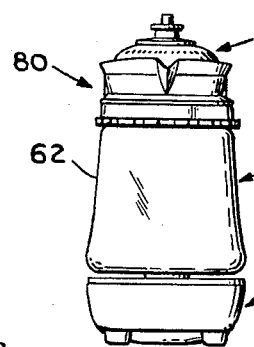
FIG. 2
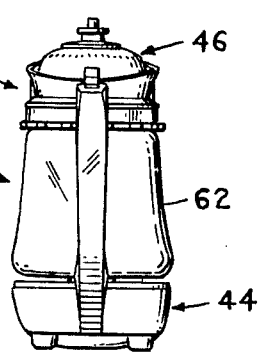
FIG. 3
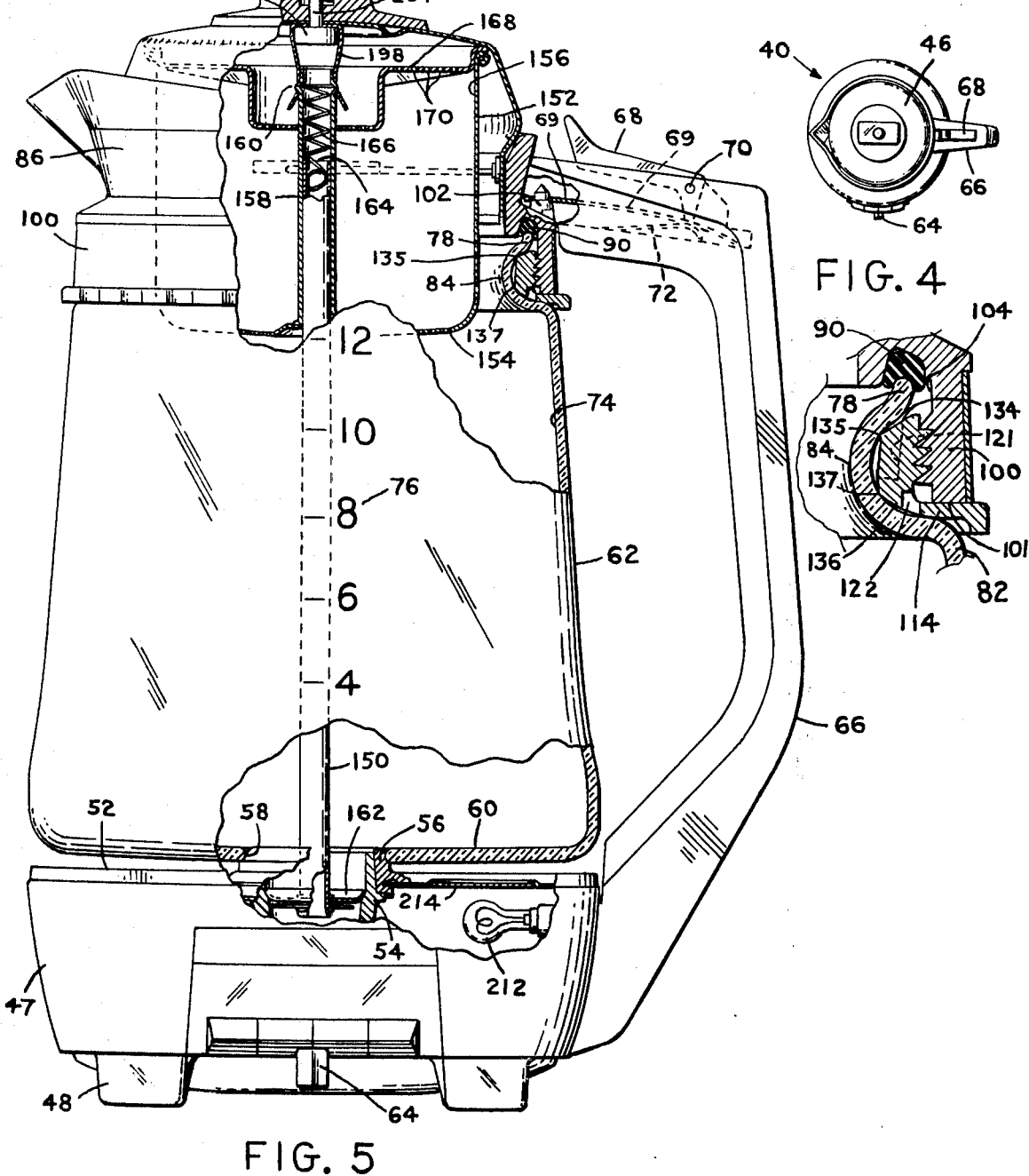
FIG. 4
FIG. 5

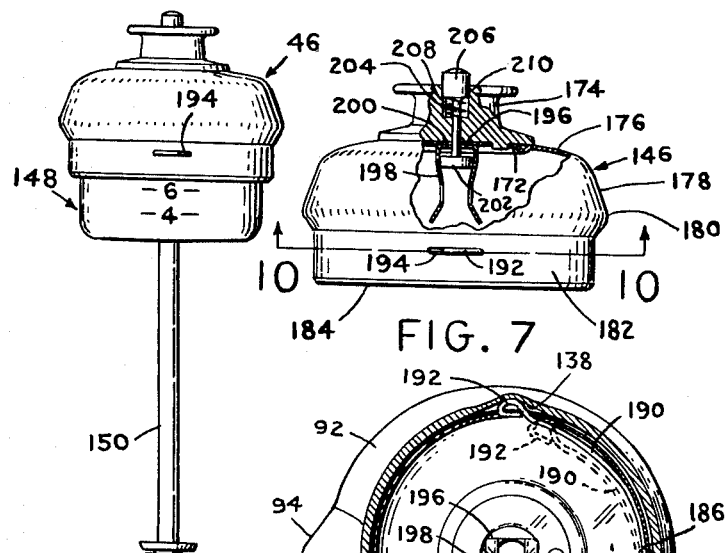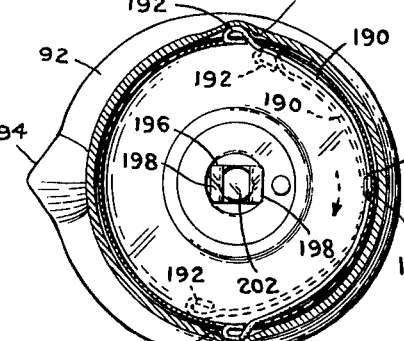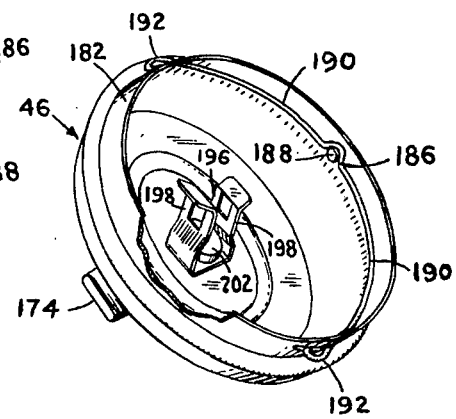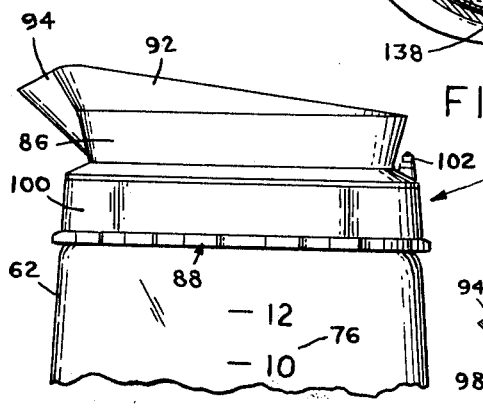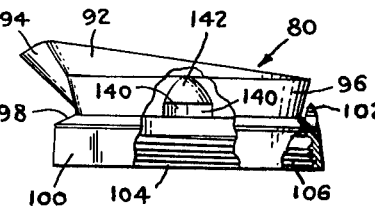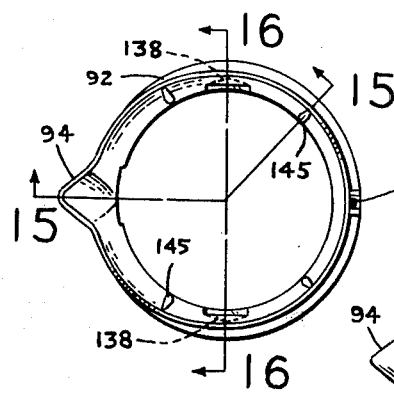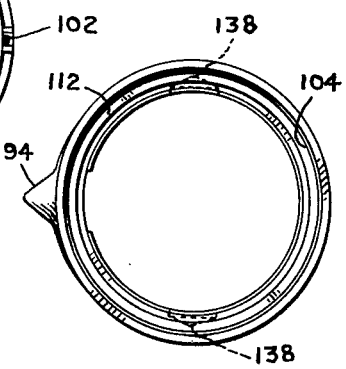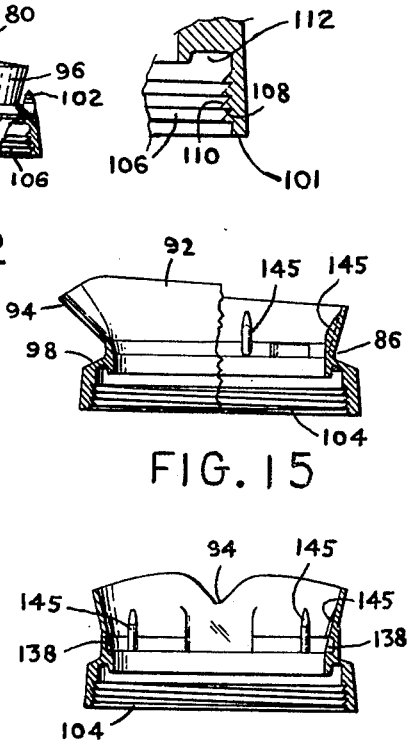

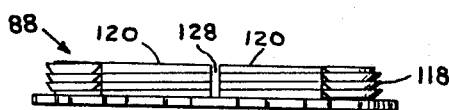
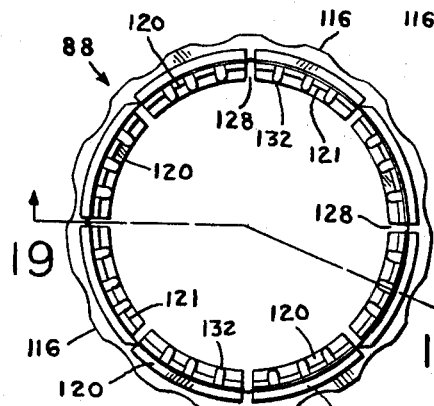
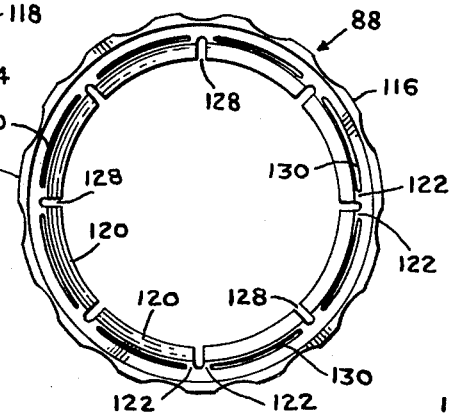
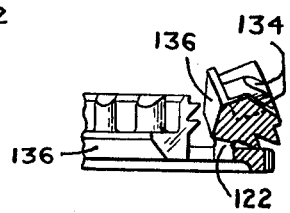
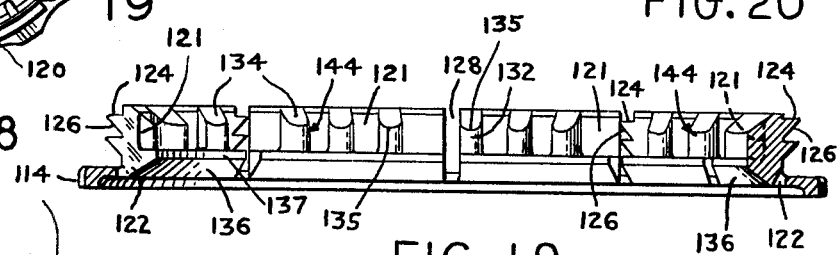
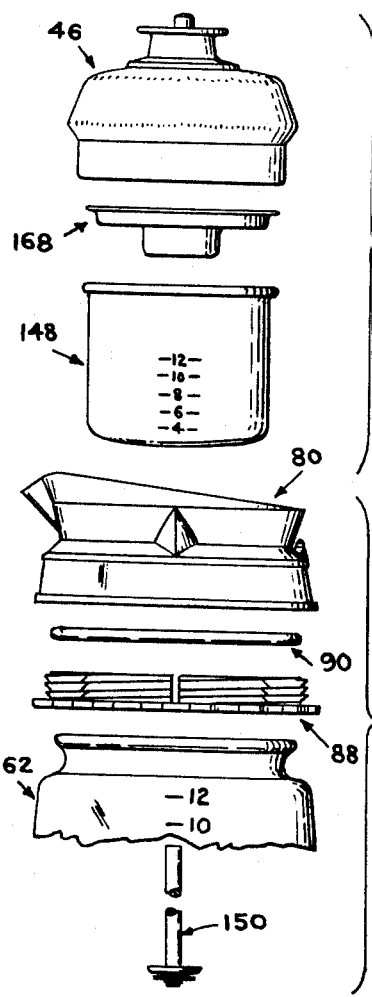
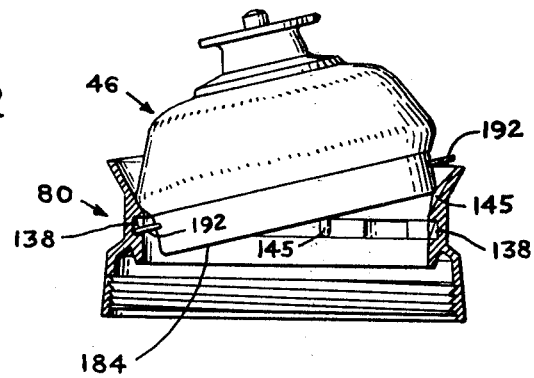

PERCOLATOR

This is a divisional of application Ser. No. 451,336, filed Mar. 18, 1974, now U.S. Pat. No. 3,939,760.

BACKGROUND OF THE INVENTION

1. Field of the Invention

This invention relates to liquid appliances and, more particularly, to an electric percolator or other liquid heating devices.

2. Description of the Prior Art

Glass receptacles have long been favored in the food preparation field because of the advantages in sanitation and appearance offered by this material. Another substantial advantage of transparent glass is that the user of the appliance can easily observe the contents without opening the receptacle. However, glass has inherent disadvantages which make it less than an ideal material for the manufacturing of appliances. Glass cannot be formed or shaped as easily as metal materials, nor can it be joined easily with other materials to form complex shapes which are often found desirable for cooking appliances. One of the reasons for this problem is that glass cannot be economically mass produced to close tolerances, and the variations in the size of the glass items produced make joining glass items with any other items relatively difficult. Also, of course, glass is a relatively fragile material and, accordingly, glass items usually have a relatively high rate of breakage, especially during manufacturing processes which require extensive handling of the glass item.

To date, two main methods have been used for joining a glass item with another item to form a composite assembly. These methods are either gluing the glass to the other item or strapping the glass to the other item. The disadvantages offered by gluing are substantial. Gluing is a relatively slow process, very often too slow for efficient mass production of an item. Additionally, gluing often requires clamping to insure a strong bond between the elements to be joined, but this clamping imparts stresses to the glass which may crack or shatter the glass during the production process or later on during normal use of the article.

Using bands to bind elements to glass also presents the problem of stresses imparted to the glass by the band. These bands are usually made of very strong and hard substances, such as stainless steel, which cannot completely conform to the surface they surround. Therefore, irregularities in the surface of the glass around which the band is applied result in less than a complete contact of the band surface with the glass. This incomplete contact produces stress concentration points on the glass at the points of contact with the band.

Additionally, the lack of complete contact between the band surface and the glass produces a rocking or loose fit between the elements which tends to make the use of the article somewhat uncertain in the mind of the user.

Lastly, the space between the glass and the band provides areas where seepage and/or leakage can occur.

Other problems have been uniquely present in relation to the construction of electric percolators or other vessels used for heating food in closed containers. In almost all of these vessels, the tops must be quickly removable in order to obtain easy access to the inside of the vessel, but at the same time the tops must be securely held in place so that they cannot fall off when liquid, for example, is being poured from the vessel. Obviously, if the top were to fall off during the pouring of liquid, serious safety hazards would be involved. Nevertheless, almost all of the tops are secured by mechanisms which require a lifting of the top from the vessel in order to remove the top. Therefore, the same forces which act against the top when the vessel is tipped to pour liquid also tend to move the top from the vessel. Further, since a lifting motion is required, very often the vessel is lifted off the surface on which it is resting when the top is sought to be removed and the vessel is dropped, or worse, inadvertently slammed down on the resting surface when the top is separated from the vessel.

Another problem has been apparent in connection with the manufacture of electrical percolators, and that is the circuitry necessary for indicator lights which show the user of the percolator when the percolator is in the rapid heating mode for brewing of coffee or liquid as compared to when it is in the "keep warm" mode or phase of operation. In the past, normal practice has been to use two indicator lights in combination to accomplish this purpose; one or both indicator lights operating brightly when the apparatus is operating in its heating mode, and a second light operating when the apparatus is in the keep warm or lower heating mode of the apparatus.

SUMMARY OF THE INVENTION

To overcome the problems of the prior art, the present invention sets forth an electric percolator having a composite apparatus including a glass element, in which the glass element is joined to other elements by means of a locking ring which provides a mechanical connection between the glass element and the other element. A method is also provided for joining the glass element with other elements in the composite apparatus without the use of glues or bands. The percolator also contains a quick-release latching mechanism for the lid which securely holds the lid to the top of the liquid container and enables the lid to be quickly disengaged by means of a rotary action.

The electric percolator set forth herein also provides simplified electrical circuitry for the indicator lights which enable a single indicator lamp to be used to indicate both modes of operation of the electric heating circuitry for the electric percolator.

Accordingly, in view of the above, it is an object of the present invention to provide apparatus for joining a glass component to another component without the use of glue or adhesives.

It is also an object of the present invention to provide a composite apparatus including a glass component which can be quickly, easily, cheaply, and safely assembled.

Another object of the present invention is to provide a composite apparatus including a glass component which can be assembled with a minimum of stress applied to the component parts during assembly.

It is a further object of the present invention to provide a composite apparatus including a glass component which is relatively simple to manufacture and assemble.

Still another object of the present invention is to provide a composite apparatus including a glass component which provides for ease of manufacture and assembly.

It is also an object of the present invention to provide a composite apparatus including a glass component in which the assembly process for the components produces a minimum of stress in the glass components of the assembly.

Another object of the present invention is to provide a composite apparatus including a glass component in which the glass components of the assembled component are under a minimum of stress both during and after assembly of the composite apparatus.

It is a further object of the present invention to provide a composite apparatus including a glass component in which the assembled components are secured in a fixed relationship to each other which prevents relative movement between the components.

Still a further object of the present invention is to provide a composite apparatus including a glass component which can tolerate and compensate for large tolerances or size discrepancies in the elements assembled in the apparatus.

It is yet another object of the present invention to provide a composite apparatus including a glass component which allows for accurate alignment of the various components when assembled.

Additionally, it is also an object of the present invention to provide a composite apparatus including a glass component which is relatively durable during assembly of the apparatus and in normal use of the apparatus.

It is another object of the present invention to provide a composite apparatus including a glass component which is relatively safe to handle during assembly and service use.

Further, it is another object of the present invention to provide a composite apparatus including a glass component which is used for holding liquids which is relatively leakproof.

It is still another object of the present invention to provide a composite apparatus including a glass component in which various components are held together by threaded connection without requiring threads formed in the glass component.

Yet another object of the present invention is to provide a composite apparatus including a glass component in which components are joined to the glass by means of a threadably connected tightening collar.

It is, additionally, another object of the present invention to provide a composite apparatus including a glass component which does not permit rocking of the glass component with relation to other components of the assembly.

Also, another object of the present invention is to provide a composite apparatus including a glass component which includes a component for joining other components to the glass component and which acts as a guard against accidental breakage of the glass component.

A further object of the present invention is to provide a quick-release latching mechanism for the lid of a liquid container which prevents the lid from being taken off by a lifting motion, thereby reducing incidents of accidentally dropping the item when attempting to remove the lid.

Still another object of the present invention is to provide a quick-release latching mechanism for the lid of a liquid container which requires rotary movement of the lid for removal of the lid.

An additional object of the present invention is to provide a quick-release latching mechanism for the lid of a percolator in which the lid, if not completely latched, will always be displaced a perceptible distance from the fully latched position to indicate that the lid is not fully latched.

It is also an object of the present invention to provide a quick-release latching mechanism for the lid of a percolator in which removal of the lid removes the entire basket and contents as a single unit.

Yet another object of the present invention is to provide a quick-release latching mechanism for the lid of a percolator in which the lid can be removed without having to hold the bowl or other heated portion of the apparatus to assist in removal of the lid.

Still another object of the present invention is to provide an electrical circuit for an electric percolator which has only one lamp to indicate the appliance is on either a high heating mode or a low heating mode of operation.

It is a further object of the present invention to provide an electrical circuit for an electric percolator which is relatively simplified, durable and economical.

Yet another object of the present invention is to provide latching means to releasably hold a composite apparatus including a glass component to a support.

Other objects and advantages will be apparent from the following description of an embodiment of the invention, and the novel features will be particularly pointed out hereinafter in connection with the appended claims.

BRIEF DESCRIPTION OF THE DRAWINGS

FIG. 1 is a side view of a percolator built in accordance with the teachings of the present invention.

FIG. 2 is a front view of the percolator shown in FIG. 1.

FIG. 3 is a rear view of the percolator shown in FIG. 1.

FIG. 4 is a top view of the percolator shown in FIG. 1.

FIG. 5 is an enlarged side elevation, partially in section, of the percolator shown in FIG. 1.

FIG. 6 is a side view of the lid and basket pump assembly of the percolator shown in FIG. 1.

FIG. 7 is a side view of the lid shown in FIG. 6.

FIG. 8 is a top view of the lid shown in FIG. 6.

FIG. 9 is a perspective view of the underside of the lid shown in FIG. 6.

FIG. 10 is a view along line 10—10 of FIG. 7 and includes a portion of the spout member.

FIG. 11 is a side view of the upper portion of the percolator bowl assembly of the percolator shown in FIG. 1.

FIG. 12 is a side view, partially broken away, of the bowl spout member shown in FIG. 11.

FIG. 13 is a top view of the bowl spout member shown in FIG. 12.

FIG. 14 is a bottom view of the bowl spout member shown in FIG. 12.

FIG. 15 is a view along lines 15—15 of FIG. 13.

FIG. 16 is a view along lines 16—16 of FIG. 13.

FIG. 17 is a side view of the spout locking ring for the bowl spout member shown in FIG. 11.

FIG. 18 is a top view of FIG. 17.

FIG. 19 is a view along line 19—19 of FIG. 18.

FIG. 20 is a view of a portion of FIG. 19, showing a segment of the tightening collar in extended position.

FIG. 21 is a bottom view of FIG. 17.

FIG. 22 is an exploded view of the lid and basket assembly.

FIG. 23 is an exploded view of the bowl spout assembly and part of the pump.

FIG. 24 shows a lid partially engaged in the bowl spout assembly.

DESCRIPTION OF THE PREFERRED EMBODIMENTS

Figure 25:
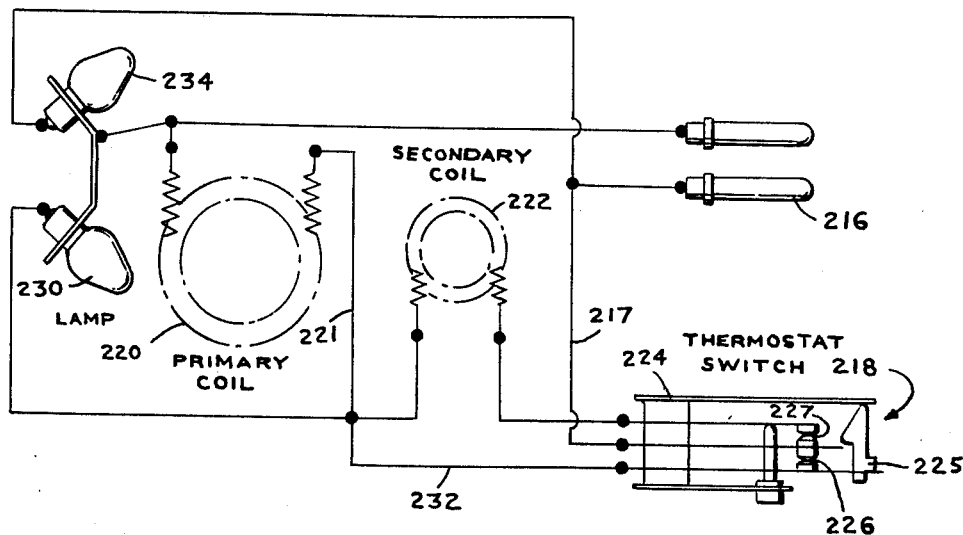
FIG. 25 is an electrical circuit of the prior art circuitry for indicator lights in an electric percolator.

As shown generally in FIGS. 1 through 5, an electric percolator, generally indicated at 40, consists of a bowl assembly 42 covered by a lid assembly 46 all of which is mounted on a base assembly 44. The base assembly 44 consists of a base member 47, supported by legs 48, which houses electrical circuitry for heating liquid in the bowl assembly. The top of the base member 47 is in the form of a disc plate 52 having a well 54 centrally located to receive liquid from the bowl assembly where the liquid is heated and then pumped in the normal percolating procedure. The bowl assembly 42 rests on a gasket 56 which engages a hole 58 in the bottom wall 60 of the bowl 62 of the bowl assembly 42 to provide a leakproof passage for liquid from the bowl 62 into the heating well 54 of the base. A flavor control, or thermostat control 64 on the base member is used to adjust the strength of the coffee by regulating the heating cycle of the electric circuitry.

A handle 66 extends upward from the base member to engage a portion of bowl assembly 42 to secure the bowl to the base and to provide means for picking up the percolator. The handle includes a bowl release latch handle 68 which is pivotally mounted on the handle at point 70 and which controls a latching member 69 having an aperture which engages a connecting point 102 on the collar of bowl assembly 42 to be described in greater detail below. A small spring and locking member 72 in handle 66 prevents the latch from accidentally opening to release latching member 69, and also lifts latching member 69 when latch handle 68 is raised.

STRUCTURE OF THE BOWL ASSEMBLY

Bowl assembly 42 consists of a bowl 62 and a spout assembly 80. Bowl 62 has side walls 74, a bottom wall 60 with a hole 58 in the center to allow for passage of liquid into the heating well of the base assembly 44. Measuring graduations 76 are located on the side of the bowl to show the level of liquid or other contents in the bowl. While the bowl is shown as being made from a transparent glass material, it should be noted that the bowl could be translucent or opaque, and could be made from a wide variety of materials. The top of the bowl ends in a lip 78 which is connected by a narrow neck portion 84 to a shoulder 82. The diameter of the neck portion 84 is narrower than the diameter of the lip 78.

As shown in FIGS. 5, 11, 12, and 23, the spout assembly 80 is positioned about the bowl from the shoulder portion 82 to above the lip 78. The spout assembly 80 consists of three components, a spout member 86, a tightening collar 88, and a gasket 90. The spout member 86 has a flared wall 92 which forms the actual pouring spout 94, a conical skirt 96 extending upward from a shoulder 98 which in turn connects with a cylindrical skirt 100. A latching point 102 is formed on the shoulder 98 of the spout member for connection with the latching mechanism 69 on the handle 66 of the base. Latching member 69 is actuated by movement of latching handle 68 to engage latching point 102. By lifting latching handle 68, the latching member 69 will be raised out of engagement with latching point 102 to release the bowl from the handle. Of course, the latching point 102 on the shoulder 98 of the spout mechanism could also be a groove or other form of depression on the shoulder instead of a projection from the shoulder. If a groove or depression is used for the latching point on the shoulder 98 of the pouring spout, then the latching member 69 on the handle 66 of the base would have a tongue or other projection adapted to engage the groove when the latching handle 69 is placed in the closed position, thereby holding the bowl assembly to the base.

The cylindrical portion 100 of the spout member 86 has a cylindrical bore 104 which is internally threaded by threads 106 having an asymmetrical configuration with flat lower surfaces 108 and tapered upper surfaces 110. The end of cylindrical bore 104 has a recess 112 adapted to receive gasket 90.

As shown in FIGS. 5 and 17–21, the pouring spout member 86 is secured to bowl 62 by means of the tightening collar 88. The tightening collar consists of a relatively flat continuous wrench ring 114 having an irregular edge with projections 116 projecting out beyond the edge of shoulder 82 of bowl 62 to allow the ring to be rotated by an appropriate rotating tool. An external thread 118 is formed on a plurality of segments 120 angularly spaced around the inner diameter of the wrench ring 114. Every thread segment 120 is connected at each of its ends to the wrench ring 114 by hinge members 122. The segments of thread on each external thread segment form a continuous external thread 118 having flat upper surfaces 124 and tapered lower surfaces 126 adapted to mesh with the internal threads 106 on the pouring spout member.

The threaded segments connected to the wrench ring are separated by a slit 128, and there is also a space 130 between the bottom of each thread segment and the wrench ring so that each thread segment 120 is free to pivot about the wrench ring 114 on its hinge points 122. The external thread segments 120 each have an inner wall 121 with a plurality of support ribs 144 and a lower tapered section 136. The support ribs 144 have an upper tapered section 134 and an innermost surface 132. As shown in FIGS. 19, 20 and 5, in the normal position of the thread segments 120, the inner diameter of the tightening collar will be the distance between the inner surface 132 of the ribs of the external thread segment 120. However, when the external thread segments are pivoted backward on their hinge members 122, the inside diameter of the tightening collar will then be the distance between the bottom tapered sections 136 of the thread segments which will be substantially greater than the inside diameter of the tightening collar when the external thread segments are in their normal upright position.

ASSEMBLING THE BOWL ASSEMBLY

The increase in the size of the inside diameter of the tightening collar 88 when the external thread segments are pivoted back on their hinge points allows the tightening collar or locking ring to be fit over the lip 78 of bowl 62 to rest on the shoulder 82. Once the tightening collar or locking ring 88 is in place on the shoulder of the bowl, the pouring spout member 86 can then be fit over the lip of the bowl to engage the tightening collar. Both the pouring spout 86 and the bowl 62 can be held in a stationary position while the locking ring is rotated to draw the pouring spout down on to the locking ring to fasten the pouring spout to the bowl. As the pouring spout member 86 is threaded onto the external thread segments 120 of the tightening collar 88, the segments 120 will tend to be moved diametrically inward to securely nestle around the narrow neck portion 84 of the bowl 62 underneath the lip 78 of the bowl, thereby firmly holding the locking ring in place. The support ribs 144 coact with the neck 84 of the bowl to properly position the external threads 118 on the tightening collar 88 for engagement with the internal threads 106 of the spout member 86 by bearing against the neck of the bowl as the threads on the tightening collar are engaged with the internal threads of the pouring spout.

During assembly of the tightening collar or locking ring 88 and pouring spout member 86 forces are produced which tend to lift the tightening collar upwardly off the shoulder of the bowl as the tightening collar is rotated to draw down the pouring spout member. The forces on thread segments 120 caused by engagement of external threads 118 on tightening collar 88 and internal threads 106 of pouring spout member 86 will produce a resultant force perpendicular to the tapered lower surfaces 126 of the threads on the tightening collar. This resultant force will have vertically upward and horizontally inward components. The upward vertical component of the resulting force on external thread 118 is resisted by the contact between the upper portion of the neck of the bowl with the edges 135 formed at the intersection of the upwardly tapered sections 134 and the vertical surfaces 132 of the support ribs 144 of thread segments 120. The inward horizontal component of the resultant force on external thread 118 acts to drive the thread segments 120 inward until two vertically spaced rings of contact are established between the tightening collar and the neck of the bowl. The upper contact ring consists of the points of contact of edges 135 with the upper portion of the neck of the bowl. The lower contact ring is formed by the contact of lower portion of the neck of the bowl and edge 137 of lowered tapered section 136 of the tightening collar.

The lower locking ribs is rotated and as rotation occurs, the bottom 101 of cylindrical skirt 100 bears against the top of flange 114 of tightening collar 88. After contact is made between the flange of the tightening collar and the bottom of the cylindrical skirt further rotation of the tightening collar causes the thread segments 120 to move radially inward until the contact portions 135 and 137 of the thread segments contact the glass at the neck portion 84 of the bowl. When contact between the contact portions 135 and 137 occurs, further inward motion of the thread segments 120 is prevented and accordingly further relative rotation between the tightening collar 88 and the pouring spout member 86 is prevented. During the engagement of the external thread segments 120 with the internal threads 106 of the cylindrical skirt, the pouring spout member will have been drawn down a suffient distance to cause the lip of the bowl 78 to firmly compress gasket 90 into the gasket recess 112 of the pouring spout 86 to insure that the connection between the pouring spout member and the bowl is a liquid-tight connection.

By having two vertically spaced rings of contact between the bowl and the tightening collar, the tightening collar and therefore the entire pouring spout assembly will be securely positioned on the bowl to resist rocking movement between the spout assembly and the bowl.

Since the bowl and the pouring spout member can be held stationary during the assembly process, it is possible to accurately align the pouring spout 54 with the bowl 62 to insure that markings or graduations 76 on the side of the bowl are properly located with respect to the pouring spout. Additionally, it should be noted that because the bowl is held stationary, there is less chance for its breakage during the assembly process, as compared to the situation where either the bowl or the pouring spout member would have to be rotated.

The projections 116 on the edge of the wrench ring 114 as mentioned earlier project beyond the shoulder 82 of the bowl. These projections in addition to offering a surface which a tightening tool can grab, also act as safety guards to reduce the chance of breakage of the bowl if it is tipped over. By projecting out beyond the shoulder of the bowl, only the projections 116 will come in contact with a flat surface on which the bowl 62 is tipped.

LATCHING MECHANISM FOR LID

As shown in FIGS. 3 and 12 through 16, the pouring spout member 86 also contains facilities for attaching a lid assembly 46 to the pouring spout in order to cover the bowl assembly 42. The facilities on the pouring spout 86 for latching a lid 146 are contained on the conical skirt 96 of the pouring spout member. These include two sockets each designated 138 formed in the conical skirt by means of two flat slanted camming surfaces 140, and an overhang section 142 protruding out over the camming surfaces 140. Additionally, a plurality of ribs 145 are formed at angularly spaced locations on the inside of the conical skirt section 96 in order to prevent the lid 146 from being properly seated if the latching mechanism is not fully engaged. Additionally, ribs 145 coact with the connecting surface 180 of the lid to properly seat the lid and to prevent the lid from being seated past the conical sloping surface of the pouring spout member.

The lid assembly 46, shown in FIGS. 5-10, consists of a lid 146 basket assembly 148, and a pump 150. The lid 146 has a top portion 172 on which a handle 174 is mounted and an upper sloping section 176 leading to a shoulder 178, which then connects to a connecting portion 180 to a cylindrical skirt 182 having a bottom surface 184. The lid handle 174 has markings on the top including arrows for unlocking and for the location at which the lid is to be placed with relation to the spout of the bowl.

The location of the spout 94 with relation to the handle 174 of the lid 146 is important because the quick-release latching mechanism which connects the lid to the pouring spout assembly 80 must be correctly aligned to properly operate. The latching mechanism on the lid consists of a lid spout engaging spring 186 connected to the inner wall of the skirt portion 182 of the lid 146 by any convenient attaching means 188, such as riveting.

The lid spout engaging spring 186 has two arms designated 190 with an engaging tongue 192 at the end of each arm. The normal resiliency of arms 190 of the lid spout engaging spring urges the tongues 192 out through the slots 194 on the skirt 182 of the lid. As shown in FIG. 10, tongues 192 are adapted to engage the sockets 138 in the pouring spout member 86 to hold the lid securely in place.

When the lid is properly aligned so that the engaging tongues 192 are aligned with the sockets 138 of the pouring spout member, then the lid can be inserted straight down into the pouring spout member. The locking overhang members 142 above the sockets have a camming action, which tends to force the engaging tongues 192 and, therefore, the spring arms 190 inward as the lid travels downward. When the lid has reached the point where the engaging tongues are in registration with the sockets 138, then the spring action 190 of the arms forces the engaging tongues 192 into the sockets 138. Note that the overhang now prevents disengagement of the engaging tongue from the socket. The only manner in which the lid can now be removed is to rotate or twist the lid with relation to the pouring spout member 86 so that the camming surfaces 140 in each socket 138 will tend to force the engaging tongues 192 inward and allow the lid to rotate to the point that the engaging tongues are no longer under the locking overhang 142.

Once the engaging tongues 192 are out of registration with the locking overhang, 142, the resilient forces of the engaging tongues being urged out by the spring arms 190 acts against the sloping walls of the conical skirt section 96 producing an upward force which tends to push the lid 146 upward and therefore substantially and perceptibly out of engagement. Additionally, once the lid 146 has risen above the level of the upsetting rib 145, the lid 146 will tend to become upset in attitude, as shown in FIG. 24, and the bottom 184 of the lid 146 will tend to rest on one of the upsetting ribs 145 of the pouring spout member so that the lid will clearly and visibly appear to be out of proper engagement.

CONNECTION OF LID TO BASKET ASSEMBLY

The lid 146 is connected to the basket assembly 148 by means of a spring 196 having fingers 198 connected to the top of the lid by any convenient fastening means 200.

The basket assembly 148 shown in FIG. 5, consists of a basket 152, having a bottom surface 154 and side walls 156, and a basket tube 158 extending upward into the basket in a well known manner. There is a bead 160 on the basket tube which is used for engaging the basket assembly with the lid 146. The pump 150 has a bottom section 162 including a disc which fits into the well 54 of the base member 47 to receive liquid which is heated in the well and driven by the force of the heat up the pump tube. The top of the pump tube 164 extends into the basket tube 158 and a spring 166 mounted in the basket tube holds the basket 152 on top of the pump tube in a proper position for perking and presses the pump into the pump well. A portion of the spring fits into pump tube 150 to hold the pump tube together with the basket tube 158. A spreader plate 168 is mounted on the basket tube and has a plurality of passages 170 to enable water which has passed from the pump tube up into the basket tube and then over the top of the basket tube and come down onto the spreader plate to be distributed over the entire area of the basket where it will then drip on to the coffee in the basket. The spring 166 of basket tube 158 fits into pump tube 150 so that when the basket is lifted with the lid, the pump tube will also be drawn out enabling the lid, basket spreader plate, and pump tube to be removed from the percolator by a single operation.

Referring again to FIGS. 5–10, the fingers 198 of the spring are adapted to grasp the bead 160 of the basket tube to hold the basket tube to the lid. In order to release the fingers 198, a spreader button 202 is positioned between the fingers, and is connected by a shaft 204 to a basket release button 206 positioned in a recess 208 of the lid handle. A spring 210 acts against the release button 206 to urge the release button and therefore the spreader button to the upper or closed position for fingers 198 so that the lid spring 196 will normally engage the basket unless the button is depressed.

To properly prepare the percolator for use, the user first fills the basket 148 with coffee and attaches the spreader plate 168 to the basket tube 158. The pump unit 150 is then inserted into the basket tube and the entire unit attached to the lid 146. The lid is then placed and latched on to the pouring spout member 86 where it is securely held against the pump tube spring and any forces which would normally be encountered either by accidentally dropping the percolator or normal use of the apparatus.

When it is desired to remove the coffee making equipment from the percolator, the lid handle 174 is merely rotated and the lid with the entire basket assembly is easily removed from the bowl of the percolator without ever having to touch the basket assembly. The pump 150 and basket 148 are then removed from the lid by merely pressing the button 206 on top of the lid handle to drop the pump and basket at any convenient location.

The operation of quick-release latching mechanism of the lid and the release mechanism for the basket assembly does not require any pulling action to be exerted by the user of the apparatus. Instead, the user would have a tendency to press downward on the lid when removing it from the pouring spout and similarly presses a button down to discard the basket assembly. Therefore, there is almost no necessity for the use of the device to have to grasp any portion of the apparatus which might be hot at any time when removing the lid or the basket assembly.

Of course, the lid can be used on the bowl without the pump basket assembly, since the connection of the pump basket assembly to the lid is independent of the connection between the lid and the pouring spout member.

SIGNAL LAMP TO INDICATE MODE OF OPERATION

As shown in FIG. 5, a lamp 212 is mounted within the base member 47 underneath a translucent window 214 of the disc plate 52. Depending upon the mode of operation of the percolator, this light will glow either brightly or dimly. When the percolator is in a high heating mode, as for example when it is brewing coffee, the lamp will have a bright glow, while when the percolator goes to the keep warm mode in which it provides just enough heat to keep the liquid in the bowl warm the lamp will glow relatively dimly.

The percolator requires only one lamp to signal both the high heat and the keep warm mode of operation. In the past, two lamps were often used to provide this function. The circuitry utilizing two lamps is shown in FIG. 25 in which electrical terminals 216 are connected to a thermostat switch 218 having contacts 227 and 226 for directing current to a primary coil 220 and a secondary coil 222 in accordance with the temperature sensed by a bimetallic rod 224 which will move actuating member 225 to open contacting points 226. In the high heating mode, all of the contact points of switch 218 are closed so that power will flow from the power line 217 of the switch through lines 232, 221 directly to the primary coil 220, and then additionally to a signal lamp 230. When the temperature reaches a desired point, the bimetallic switch will open the contact point 226 disconnecting the line 232 to the primary coil and, therefore, forcing all of the current to go through contact 227 to the secondary coil 222 in series with the primary coil. Voltage to the primary coil 220 is now substantially reduced by the large resistance of the secondary coil 222 that has gone into the line and, accordingly, the voltage available to lamp 230 is much reduced. Therefore, the second indicating lamp 230 will go out when the secondary coil is brought into the circuit to cut down the amount of power expended and, therefore, the heat produced by the appliance. Since lamp 230 will not be visible when the secondary coil is in operation, it is necessary to have a lamp 234 constantly operating whenever power is provided to the thermostat switch and this lamp therefore is used to show that the device is plugged in and also acts as an indicating light to indicate when the percolator is in the keep warm mode of operation.

Figure 26:
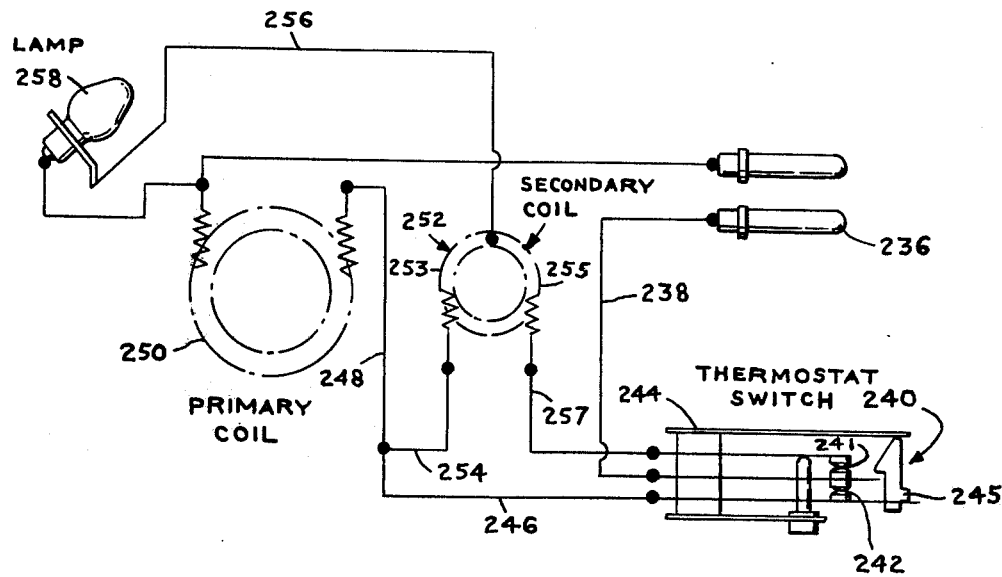
FIG. 26 is a circuit built in accordance with the teachings of the present invention for an indicator light in an electric percolator.

The circuit of the present invention is shown in FIG. 26 and has terminals 236 feeding power through line 238 to a thermostatic switch 240 which has contact points 241 and 242, with contact points 242 opened by a bimetallic rod 244, and actuating member 245. Thermostatic switch 240 can be considered as a tandem pair of single pole single throw switches. During the high heating cycle, contact points 241 and 242 will be closed, and power will go from line 238 through contact 242 of the thermostatic switch 240 to lines 246 and 248 to the primary coil 250. Additionally, a portion of the power will go to the lefthand portion 253 of secondary coil 252 through line 254 and from there through line 256 which is connected at the center of the secondary coil to the lamp 258. Also, some current will follow from power line 238 through contact 241 of thermostat switch 240, through line 257 to the other side 255 of secondary coil 252 and from there through line 256 to lamp 258. The current flowing to the secondary coil through lines 254 and 257 in effect splits coil 252 into two impedences in parallel, thereby reducing the total impedance so that the lamp 258 will light relatively brightly to indicate that the percolator is in the high heat mode.

When the temperature of the liquid in the bowl becomes sufficiently high, the bimetallic rod 244 will break the lower contact 242, forcing all of the current through line 257 from the thermostat to the secondary coil 252 which will now be in series with the primary coil to thereby reduce substantially the current flowing to the combination of the primary and the secondary coil. Also, the lamp 258 is now in a series relationship with only one-half 255 of the secondary coil so that the impedance is increased as compared to the impedance of the two halves of the secondary coil in parallel. Therefore, the lamp will immediately become dimmer upon the opening of contacts 242 to indicate that the percolator is now on a low heat or keep warm mode of operation.

An alternate wiring for the circuit of the present invention reverses the positions of the terminal 236 and line 238 with line 257, with relation to contact points 241 of thermostatic switch 240.

The advantages of the percolator described herein are numerous. The use of the locking ring or tightening collar for connecting the pouring spout to the bowl to form the bowl assembly enables the rapid, efficient, safe, and economical manufacture and assembly of a relatively complex composite apparatus which includes a glass component. The locking ring is easily placed over the lip of the bowl and then the pouring spout member is securely attached by rotating the locking ring with an appropriate tool. No adhesives, glues or other bonding methods are necessary for connecting the pouring spout assembly to the bowl. Further, it is not necessary to clamp any items to the bowl in order to secure them. Therefore, the stresses on the bowl or the glass portion of the composite apparatus are relatively low with almost no residual stresses placed on the glass because of the assembling operation.

The components of the resultant force produced on the tapered surfaces of the tightening collar thread force the tightening collar into the proper position on the neck of the bowl so that there are two vertically spaced contact circles between the bowl and the tightening collar. The vertical displacement of contact circles ensures a stable fixed connection between the pouring spout assembly and the bowl, free from any rocking or other relative movement between the assembled components.

It should also be noted that the use of the tightening ring for connecting the pouring spout member to the bowl enables bowls of relatively wide dimensional tolerances to be used since the material from which the tightening collar is made is relatively flexible, and the tightening collar will be deformed during the assembly process until it makes sufficient contact with the neck of the bowl to provide a firm and secure connection. Contact of the tightening collar to the bowl and therefore the connection of the pouring spout assembly to the bowl will occur all around the bowl, and not merely at one or two isolated points as is often the case with adhesive assemblies or assemblies which have been banded together. Accordingly, the stresses placed on the bowl will be evenly distributed and, therefore, of much lower magnitude.

The method for assembling composite articles described provides secure connections that makes it possible to produce articles which were considered impractical previously. Now the more complex and complexly-shaped parts of the article which require greater dimensional tolerances can be made from easily manufacturable materials while the remainder of the assembly can be made from glass or other materials considered difficult to work with, so that the item as a whole will have the desirable characteristics associated with the use of the difficult material.

As mentioned previously, the structure and method of manufacturing the bowl assembly allows the pouring spout to be accurately positioned with relation to the glass portion of the apparatus so that markings or any other design can be effectively used.

It should also be pointed out that the construction of the tightening collar using several hinged sections to form the external thread of the collar has many advantages over other methods. It avoids the problem of stripped external threads often associated with segmented external threads because all of the threads on the tightening collar are connected to a fixed point of reference, namely the wrench ring. Therefore, there can be no misalignment of individual thread segments tending to strip the threads. Additionally, the wrench ring presents an aesthetically pleasing appearance to the purchaser of the device since there are no large gaps or other discontinuities which cannot be adequately covered during the assembly process.

The service life of the percolator incorporating the quick-release latching mechanism and the bowl assembly with the tightening collar should provide superior to those of other apparatuses which contain glass components. As pointed out the tightening collar used in the bowl assembly projects past the bowl to act as a guard protecting the bowl against impact upon accidental tipping.

Additionally, service life is extended because accidental banging and tipping of the appliance is avoided. The usual appliance requires a lifting or pulling motion to disengage the lid. Often, the user of the usual appliance, while intending to try and lift off the lid, will lift the entire appliance off the table on which it is placed, either because the bottom of the appliance was not held securely or else because the force required to remove the lid was large enough to require the person to use both hands in order to attempt to pull the lid from the body of the appliance. In such circumstances, the person seeking to remove the lid often inadvertently bangs the appliance down on top of the table when he is finally able to disengage the lid from the body of the apparatus.

In contrast, by requiring that the lid be twisted for removal, it is the natural approach to press down on the lid when twisting, and pressing downward will tend to more firmly seat the appliance on whatever support surface it is resting when the lid is removed. This, therefore, will tend to reduce the number of times the percolator is banged and also the number of times the percolator will tend to be accidentally pushed or lifted off the support surface.

As described in the operation of the device, a simple twisting operation on the cover will enable the user of the percolator to remove the lid, the basket containing the coffee grounds, and the pump all in one easy motion. Then the basket and the coffee grounds can be disposed of separately by merely pressing on the release button on the top of the cover. This simplicity of operation makes it unnecessary for the user at any time to touch the hot coffee grounds, the pump assembly of the percolator, or any other hot part of the appliance, therey greatly enhancing the safety of using this apparatus.

As pointed out, the electrical circuitry for the pilot light operation of the percolator is relatively simple and should insure relatively longer, trouble-free service life for the device as compared to those previously used in the prior art, since the signal light is subjected to relatively low voltage during most of the time it is on and low voltage greatly extends lamp life.

It will be understood that various changes in the details, materials and arrangements of parts which have been herein described and illustrated in order to explain the nature of the invention may be made by those skilled in the art within the principle and scope of the invention as expressed in the appended claims.

What is claimed is:

1. An electrical circuit for lighting a lamp in response to the heating mode of an electric appliance comprising:
    a pair of power terminals;
    a primary heating means;
    a secondary impedance means having first and second portions;
    a lamp means;
    a thermally sensitive switch means;
    a first serially connected current loop including one of said power terminals, said thermally sensitive switch means, said primary heating means and said other of said power terminals;
    a second serially connected current loop including one of said power terminals, said thermally sensitive switch means said first portion of said second impedance means, said lamp means and said other power terminal;
    a third serially connected current loop including one of said power terminals, said thermally sensitive switch means, said second portion of said secondary impedance means, said lamp means and said other of said power terminals;
    a fourth serially connected current loop including one of said power terminals, said thermally sensitive switch means, said first and second portions of said secondary impedance means, said primary heating means and the other of said power terminals;
    said thermally sensitive switch means operative to conduct current in said first, second and third current loops to provide a high heat mode of operation and operative to conduct current in said third and fourth current loops in response to temperature sensed by said thermally sensitive switch means to provide a low heat mode of operation.

2. The electric circuit for lighting a lamp in response to the heating mode of an electric appliance according to claim 1 wherein:
    said thermally sensitive switch means has first and second contact points;
    said first and second current loops include said second contact points of said thermally sensitive switch means; and
    said second contact points of said thermally sensitive switch means are closed in said high heat mode of operation and open in said low heat mode of operation.

3. The electric circuit for lighting a lamp in response to the heating mode of an electric appliance according to claim 2, wherein said secondary impedance means includes a secondary heating means.

4. The electric circuit for lighting a lamp in response to the heating mode of an electric appliance according to claim 3 wherein:
    said first contact points are connected to said secondary heating means at a first point on said secondary heating means;
    said second contact points are connected to said secondary heating means at a second point on said secondary heating means; and
    said lamp means is connected to said secondary heating means at a point intermediate said first and said second points on said secondary heating means.

* * * * *